(12) United States Patent
Chunjian et al.

(10) Patent No.: US 8,766,627 B2
(45) Date of Patent: Jul. 1, 2014

(54) ANGLE POSITION SENSOR

(75) Inventors: Wang Chunjian, Shanghai (CN); Shun Zhang, Shanghai (CN); Yan Chen, Shanghai (CN); Yu Deng, Shanghai (CN); Manuel Schoepke, Shanghai (CN)

(73) Assignee: United Automotive Electronic Systems Co., Ltd., Shanghai (CN)

( * ) Notice: Subject to any disclaimer, the term of this patent is extended or adjusted under 35 U.S.C. 154(b) by 477 days.

(21) Appl. No.: 13/119,482

(22) PCT Filed: Sep. 15, 2009

(86) PCT No.: PCT/CN2009/001029
§ 371 (c)(1),
(2), (4) Date: Mar. 21, 2011

(87) PCT Pub. No.: WO2010/031246
PCT Pub. Date: Mar. 25, 2010

(65) Prior Publication Data
US 2011/0234211 A1    Sep. 29, 2011

(30) Foreign Application Priority Data

Sep. 17, 2008  (CN) .......................... 2008 1 0200016

(51) Int. Cl.
*G01B 7/30* (2006.01)
*G01D 5/14* (2006.01)
(52) U.S. Cl.
CPC ...................................... *G01D 5/145* (2013.01)
USPC .................................................. 324/207.25
(58) Field of Classification Search
None
See application file for complete search history.

(56) References Cited

U.S. PATENT DOCUMENTS

| | | | |
|---|---|---|---|
| 4,568,846 A * | 2/1986 | Kapadia .................... | 310/156.83 |
| 5,789,917 A * | 8/1998 | Oudet et al. ............... | 324/207.2 |
| 5,861,745 A | 1/1999 | Herden | |
| 6,141,482 A | 10/2000 | Massarksy | |
| 6,232,771 B1 * | 5/2001 | Herden et al. ............ | 324/207.25 |
| 6,414,482 B1 * | 7/2002 | Mase .......................... | 324/207.2 |
| 6,601,287 B2 * | 8/2003 | Pop, Sr. ........................ | 29/596 |
| 6,693,424 B2 | 2/2004 | Makino et al. | |
| 7,038,345 B2 * | 5/2006 | Fratta ....................... | 310/156.53 |
| 2001/0009366 A1 * | 7/2001 | Kono et al. ................. | 324/207.2 |

FOREIGN PATENT DOCUMENTS

| CN | 101358833 A | 2/2009 |
|---|---|---|
| CN | 201281584 Y | 7/2009 |

OTHER PUBLICATIONS

Wo 2010/031246 with English International Search Report published on Mar. 25, 2010.

* cited by examiner

*Primary Examiner* — Melissa Koval
*Assistant Examiner* — Courtney McDonnough
(74) *Attorney, Agent, or Firm* — Lau & Associates, LLC.

(57) ABSTRACT

The present invention discloses an angular position sensor, which includes a rotor core as well as a stator core coaxially around this rotor core. Between the rotor core and the stator core is a first air gap, and inside the rotor core a second air gap, which is provided inside with a hard magnet. The stator core has a third air gap inside, which is provided inside with a magnetic flux sensing element. It is obvious that the present invention, by substituting the combination of the hard magnet and the rotor core for the design of ring magnet in the prior art, obtains the good linearity within a wider range.

15 Claims, 9 Drawing Sheets

ANGLE POSITION SENSOR

FIELD OF THE INVENTION

The present invention relates to a sensor device, and particularly to an angular position sensor device with a wide linearity range and good linearity.

BACKGROUND OF THE INVENTION

An angular position sensor, as an important sensor device, is widely used in the automobile and other electromechanical control fields. How to broaden its linearity range and improve its linearity has always been a subject those skilled in the art are dedicated to. A commonly used angular position sensor uses a magnetic induction element to detect the magnetic field variation, which is then converted into the electrical signal output corresponding to the angular position. In order to improve its output linearity relative to the rotation angle of the measured object and broaden the linearity range, those skilled in the art have done a great deal of research, and obtained various design proposals about the magnetic circuit.

For example, the American patent specification U.S. Pat. No. 5,861,745A disclosed on Jan. 19, 1999 presents an angle measurement device, which obtains the complete linearity range bigger than 180° by making use of a radially magnetized ring magnet that rotates together with the measured object. In this solution, however, the wider the required linearity range is, the bigger the ring magnet will be, thus increasing the cost of raw material; besides, the magnet material is more difficult to be processed than other metal materials, especially the more complicated ring magnet that is adopted in this solution, whose accuracy is difficult to be guaranteed during processing and positioning, which will increase the processing cost in the production process.

CONTENTS OF THE INVENTION

A purpose of the present invention is to provide an angular position sensor, which is not only good in the linearity, but simpler in the manufacturing process and lower in the production cost as well.

In order to achieve the above purpose, the present invention provides an angular position sensor including a rotor core as well as a stator core coaxially around this rotor core. A first air gap is provided between the rotor core and the stator core; The first air gap is a uniformly distributed ring air gap, with its size in the radial direction of the rotor core being called the width of the first air gap. The ratio of the width of the first air gap to the diameter of the rotor core is bigger than or equal to 1:5; a second air gap with a hard magnet therein is provided inside the rotor core, and a third air gap with a magnetic flux sensing element therein is provided inside the stator core.

Furthermore, the second air gap is designed to be linear along a certain diameter direction of the rotor core, with the size of the second air gap in this diameter direction being called its length and the size of the second air gap in the radial direction of the rotor core its width.

Furthermore, the ratio of the length to the width of the second air gap is bigger than or equal to 5:1.

Furthermore, the second air gap is filled with the hard magnet.

Furthermore, the ratio of the width of the first air gap to that of the second air gap is bigger than or equal to 2:1.

Furthermore, the second air gap is in parallel with the above-mentioned diameter and located at a side of the diameter.

Furthermore, the second air gap includes a first portion and a second portion, which are in parallel with the above-mentioned diameter and located at both sides of this diameter.

Furthermore, the first portion and the second portion are provided inside with a hard magnet, respectively, whose magnetic poles are set in the same direction.

Furthermore, the second air gap is located where the above-mentioned diameter is.

Furthermore, the second air gap is provided inside with two hard magnets symmetrical to the axis of the rotor core, with the magnetic poles of the two hard magnets set in the same direction.

Furthermore, the second air gap is provided in the middle with one hard magnet.

Furthermore, the second air gap includes three portions uniformly distributed in three radial directions of the rotor core, with the two portions therein being provided with a first hard magnet and a second hard magnet, respectively.

Furthermore, the magnetic poles of the first and the second hard magnets are set in the opposite direction.

Furthermore, the second air gap, located at a certain diameter of the rotor core, is of a shuttle-shaped design.

Furthermore, the rotor core includes multiple rotor portions, with the above-mentioned second air gap formed between two adjacent rotor portions.

Furthermore, the stator core includes multiple stator portions, with the above-mentioned third air gap formed between two adjacent stator portions.

Furthermore, the rotor core and the stator core are made from soft magnetic material.

In summary, the present invention, by substituting the combination of the hard magnet and the rotor core for the prior art ring magnet, obtains good linearity within a wider range. Compared with the prior art, the present invention is easy in assembly, as well as lower in cost and simplified in process due to no need for processing the more difficult ring magnet. Moreover, by changing the size of the air gap and the hard magnet, the present invention can make the magnetic flux density where the magnetic flux sensing element is located be linear with the rotation angle within a wider range, thus obtaining a wider linearity range and better linearity as well as improving flexibility of the structure of the rotor core and the stator core.

DETAILED DESCRIPTION OF THE EMBODIMENTS

In order to make purposes and characteristics of the present invention more obvious and more understandable, the embodiments of the present invention will further be described below with reference to drawings.

Embodiment 1

Figure 1:
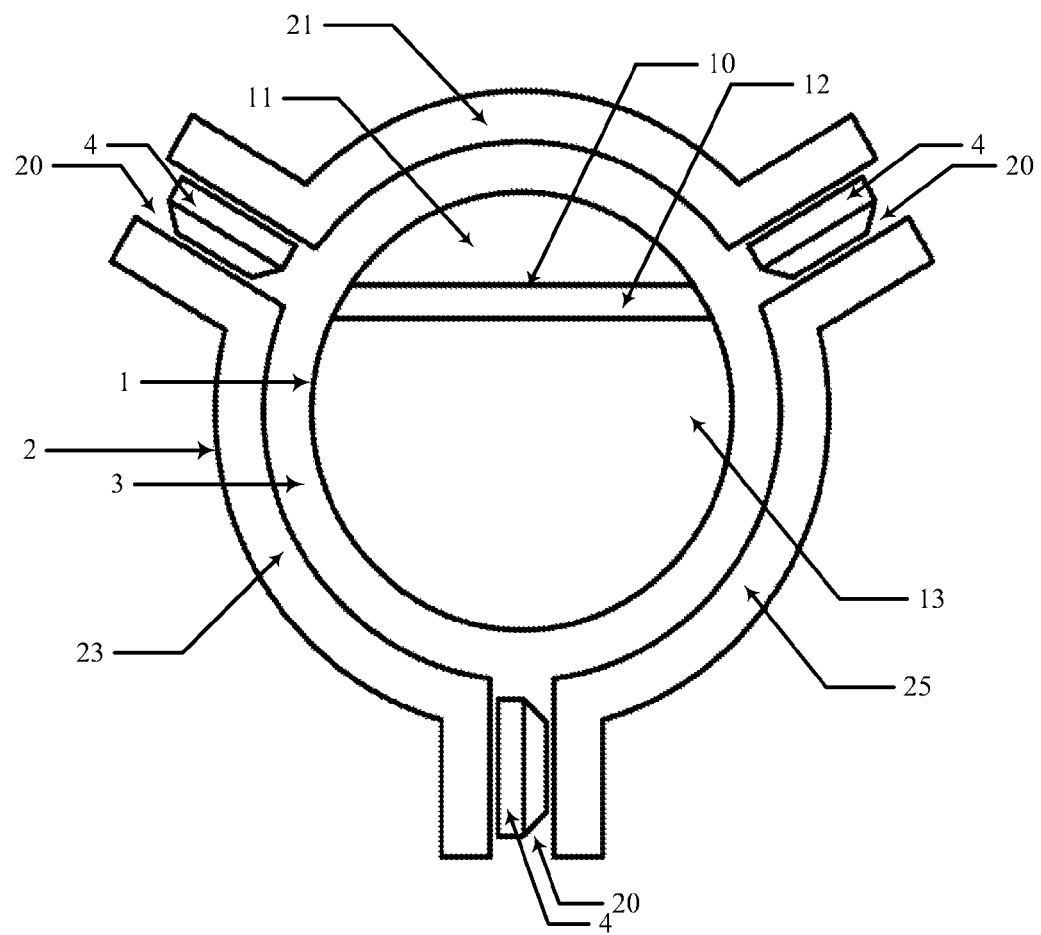
FIG. 1 is a structural schematic drawing of the angular position sensor provided in Embodiment 1 of the present invention.

Reference is made to FIG. 1 which is a structural schematic drawing of the angular position sensor provided in Embodiment 1 of the present invention. As shown in the drawing, this angle position sensor includes a rotor core 1 as well as a stator core 2 coaxially around this rotor core 1, and between the rotor core 1 and the stator core 2 is a first air gap 3. The rotor core 1 is provided inside with a second air gap 10, which is used for receiving a hard magnet 12, such that this hard magnet 12 can constitute a magnetic circuit together with the rotor core 1 and the stator core 2. Besides, inside the stator core 2 is a third air gap 20, where a magnetic flux sensing element 4 is located for measuring the magnetic flux and converting it into an electrical signal.

With this magnetic circuit design, the hard magnet 12 constitutes a magnetic circuit together with the rotor core 1 and the stator core 2, thus making the exterior magnetic field distribution of the rotor core 1 close to that of the magnetic circuit constituted by the ring magnet. It is discovered by the further research that the size of the first air gap 3 relative to the rotor core 1 will affect the magnetic field distribution, i.e. affecting the linearity range and the linearity of the angular position sensor, which will be explained below in detail with reference to FIG. 2.

Figure 2:
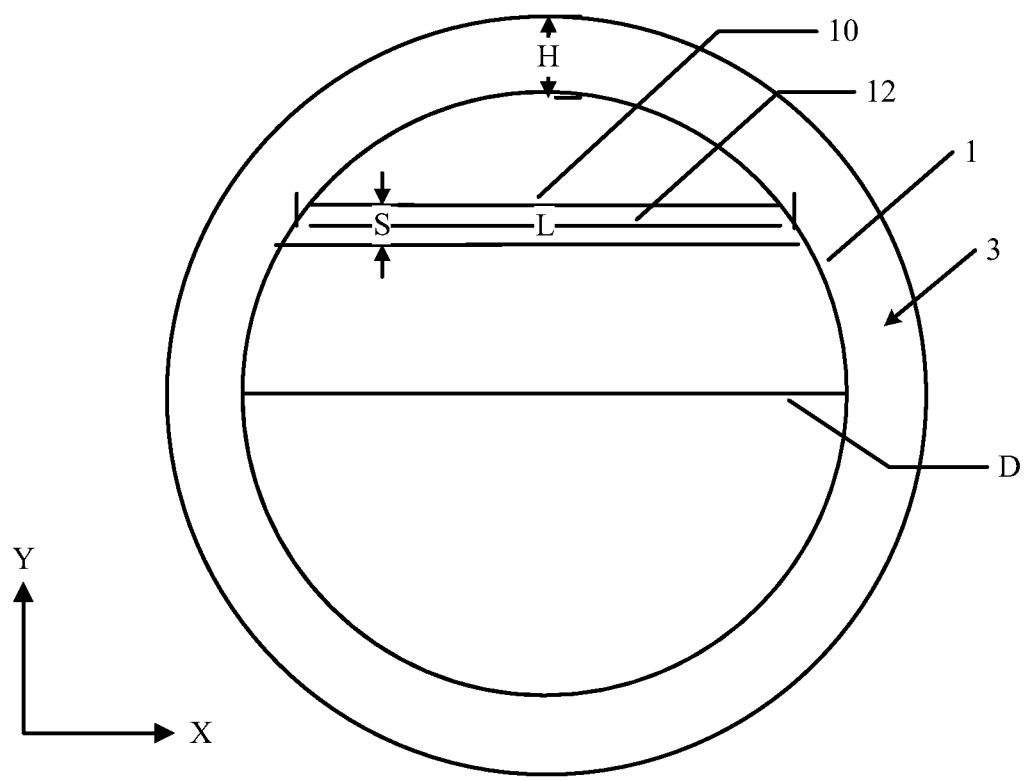
FIG. 2 is a section-enlarged schematic drawing of the rotor core 1 and the first air gap 3 in FIG. 1.

Reference is made to FIG. 2 which is a section-enlarged schematic drawing of the rotor core 1 and the first air gap 3 in FIG. 1. As shown in the drawing, the first air gap 3 is a uniformly distributed ring air gap, and its size in any radial direction of the rotor core 1 is called the width H of the first air gap, which usually determines the size of the first air gap 3 (taking no account of thickness of the rotor core 1); besides, in the drawing is also shown a certain diameter D of the rotor core, which usually determines the size of the rotor core 1 (taking no account of thickness of the rotor core 1). It is discovered by research that when the ratio of the width H of the first air gap to the diameter D of the rotor core is bigger than or equal to 1:5, the exterior magnetic field distribution of the rotor core 1 can already meet the requirement, obtaining the good linearity within a wider range. It is discovered by the further research that with the above ratio increasing, the linearity of the angular position sensor will become better, while the magnetic field intensity weaker. Therefore, in practice those skilled in the art can set the ratio as required, which is usually smaller than 1:1.

Figure 3:
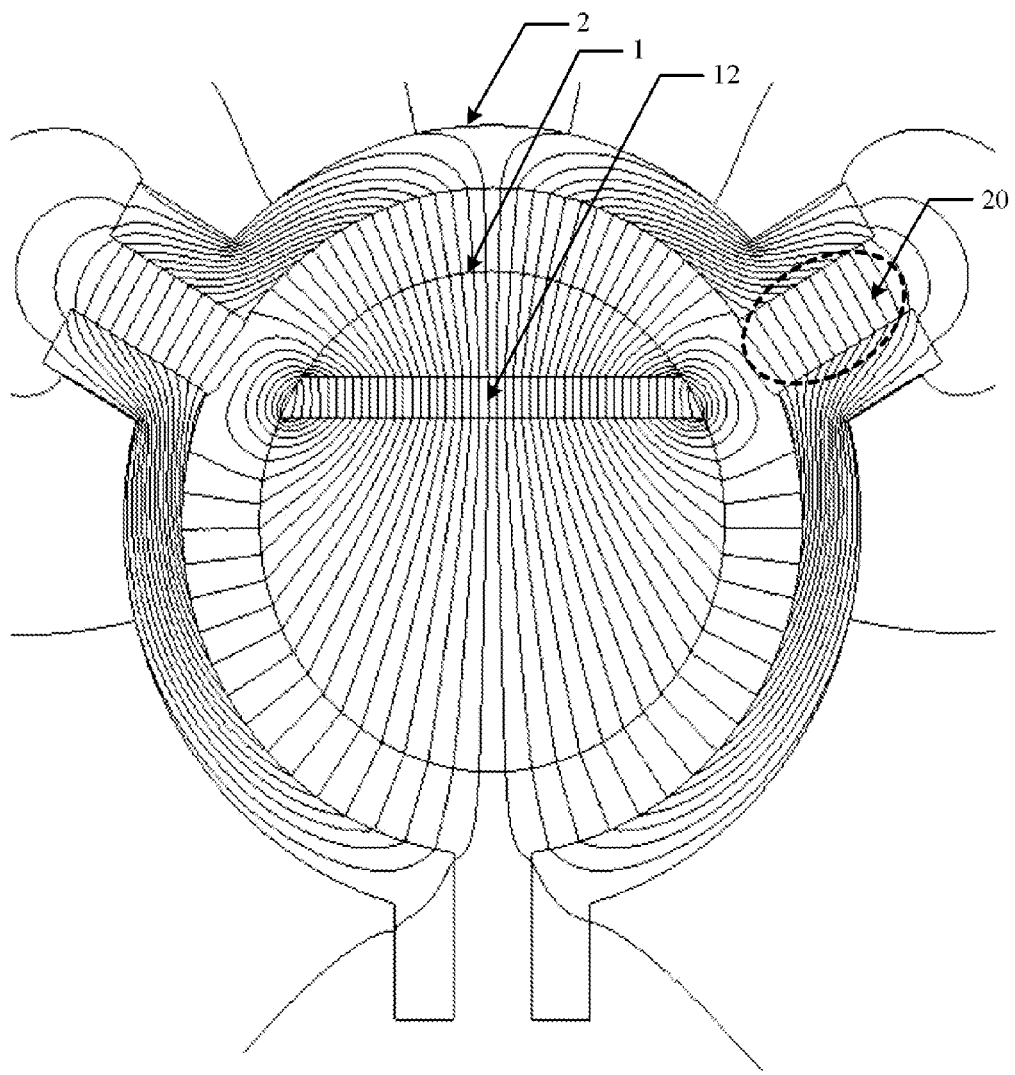
FIG. 3 is a magnetic field distribution drawing of the angular position sensor provided in Embodiment 1 of the present invention.

Reference is made to FIG. 3 which shows the magnetic field distribution drawing of the angular position sensor in the above embodiment. It can be seen from the drawing that with the above setting, the line of magnetic force is distributed uniformly through the third air gap 20 (i.e. the position where the magnetic flux sensing element 4 (see FIG. 1) is located) (as shown inside the dotted circle). Besides, when the rotor core 1 rotates with the measured object, the stator core 1 rotates relative to the stator core 2, and the hard magnet 12 also rotates together with the rotor core 1. Therefore, the magnetic flux through the magnetic flux sensing element 4 is increased or decreased accordingly, and the variation of the magnetic flux is basically linear with the rotation angle of the rotor core 1 relative to the stator core 2 within a certain range of the rotation angle.

The rotor core 1 and the stator core 2 are usually made up of multiple pieces of soft magnetic material for the formation of an air gap between them. In this embodiment, for example, the rotor core 1 is made up of two pieces of soft magnetic material, such a design being simpler. Certainly, three or more pieces can also be used, so long as their exterior magnetic field distribution can meet the requirement. Please see FIG. 1 for details. The rotor core 1 is composed of two rotor portions 11 and 13, between which is a second air gap 10 filled with the hard magnet 12. The stator core 2 in this embodiment uses three pieces of soft magnetic material (i.e. being composed of three stator portions 21, 23 and 25), and thus the third air gap 20 where the magnetic flux sensing element 4 is fixed is formed between two adjacent stator portions. Likewise, the number of the stator portion is unlimited to what mentioned above. It can be two or more than three and thus two or more magnetic flux sensing elements 4 can be provided correspondingly. It is optional with no effect on the substance of the present invention.

In addition, it has been explained in the above description that, with the ratio of the width H of the first air gap to the diameter D of the rotor core reasonably set, the line of magnetic force where the magnetic flux sensing element 4 is located is distributed uniformly, making the angular position sensor obtain good linearity within a wider range, thus improving flexibility of the structure of the rotor core 1 and the stator core 2. It will be specifically described in the following embodiments.

Embodiment 2

Figure 4:
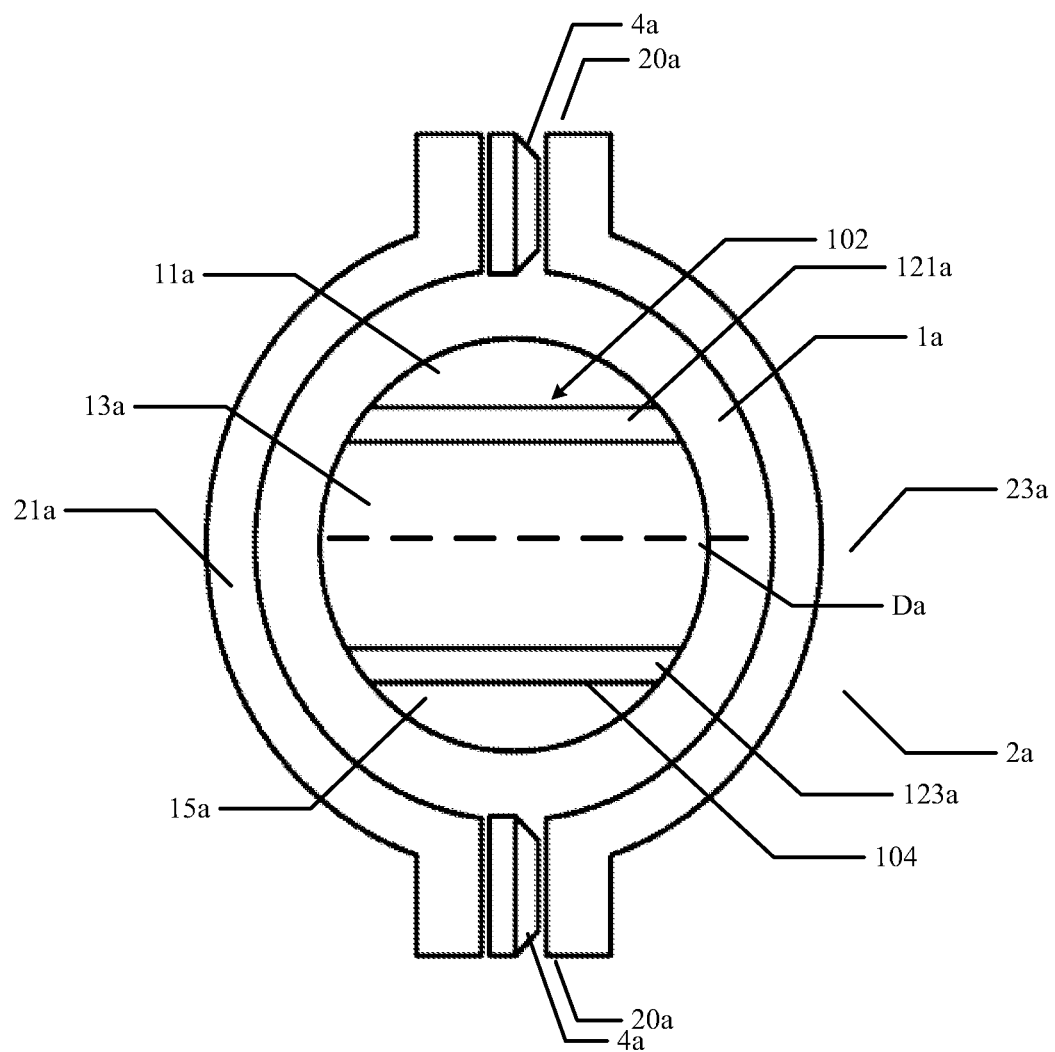
FIG. 4 is a structural schematic drawing of the angular position sensor provided in Embodiment 2 of the present invention.

Reference is made to FIG. 4 which is a structural schematic drawing of the angular position sensor provided in Embodiment 2 of the present invention. As shown in the drawing, its rotor core 1a is composed of three rotor portions 11a, 13a and 15a, and thus the second air gap is formed between two adjacent rotor portions. The second air gap as shown in the drawing includes a first portion 102 and a second portion 104, which are in parallel with the diameter Da, located at both sides of the diameter Da, and provided inside with hard magnetic bodies 121a and 123a. Here the magnetic poles of the hard magnetic bodies 121a and 123a are set in the same direction (for example, if the N poles of the hard magnetic bodies 121a and 123a are both inwardly perpendicular to the principal plane, then the S poles are both outwardly perpendicular to the principal plane; or vice versa), such that the hard magnetic bodies 121a and 123a can constitute a magnetic circuit together with the rotor core 1a and the stator core 2a. In addition, the stator core 2a is composed of two stator portions 21a and 23, and thus the third air gap 20a is formed between them, as shown in the drawing. Correspondingly, the two magnetic flux sensing elements 4a are placed in the third air gap 20a.

Embodiment 3

Figure 5:
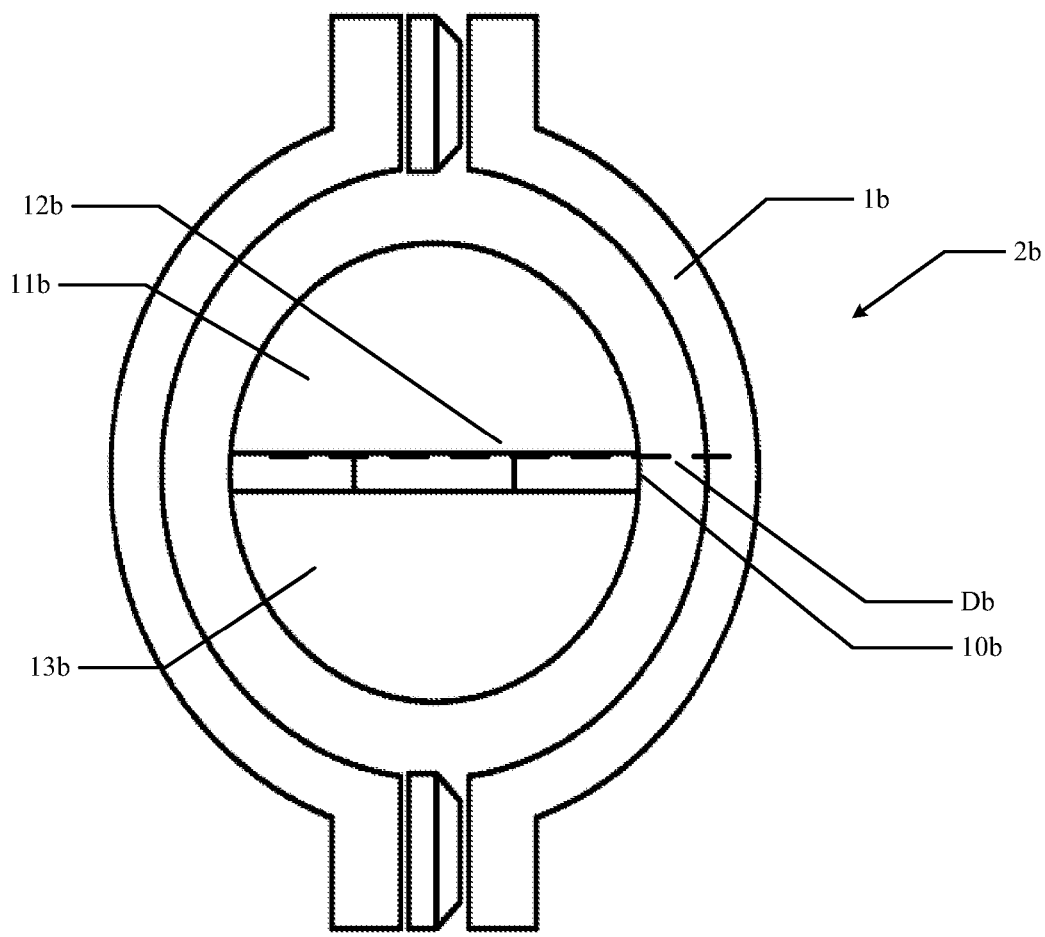
FIG. 5 is a structural schematic drawing of the angular position sensor provided in Embodiment 3 of the present invention.

FIG. 5 is a structural schematic drawing of the angular position sensor provided in Embodiment 3 of the present invention. As shown in the drawing, the structure of its stator core 2b is the same with that in Embodiment 2, and will no longer be described here in detail. However, its rotor core 1b is composed of two symmetrical rotor portions 11b and 13b, that is, the second air gap 10b is located where the diameter Db is. In addition, the second air gap 10b is provided in the middle with one hard magnetic body 12b, which is used for constituting a magnetic circuit together with the rotor core 1b and the stator core 2b.

Embodiment 4

Figure 6:
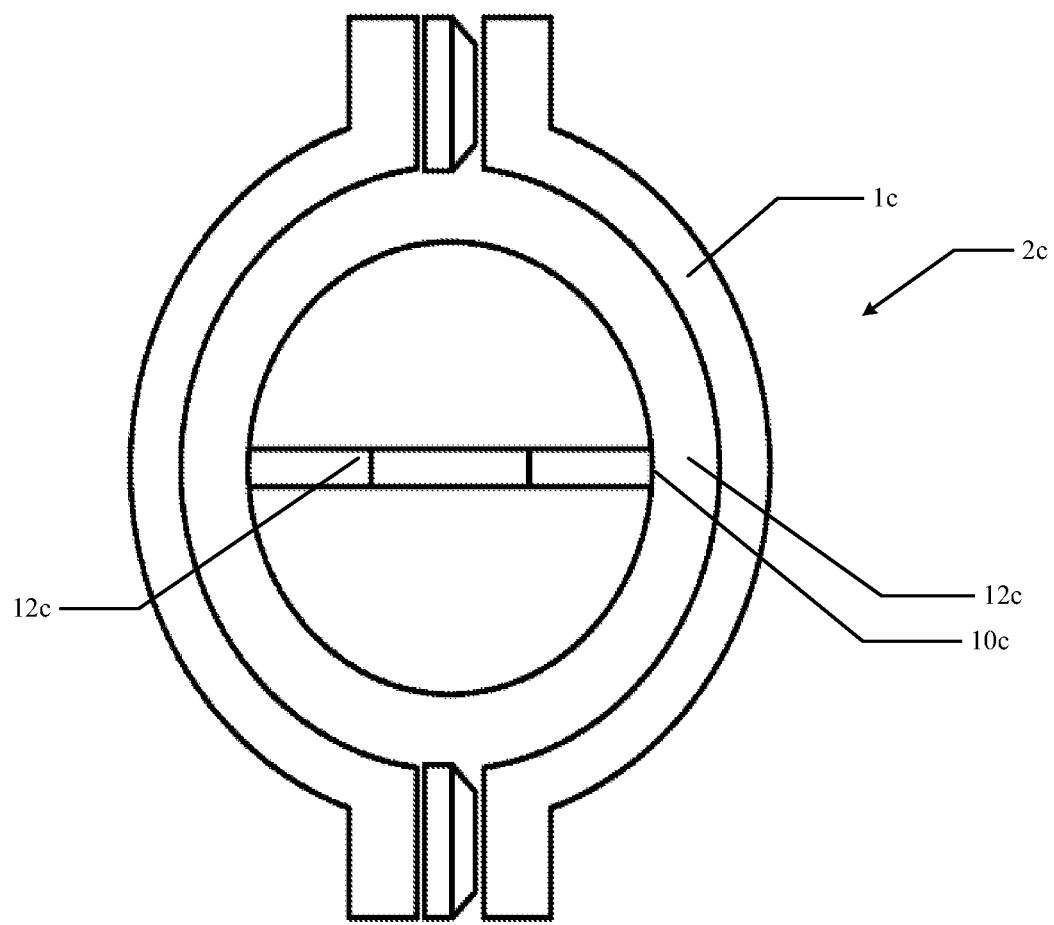
FIG. 6 is a structural schematic drawing of the angular position sensor provided in Embodiment 4 of the present invention.

FIG. 6 is a structural schematic drawing of the angular position sensor provided in Embodiment 4 of the present invention. As shown in the drawing, the structure of the rotor core 1c and the stator core 2c is basically the same with that in Embodiment 3, with the difference only in how the hard magnet is set inside the second air gap 10c. That is, the second air gap 10c is provided inside with two hard magnetic bodies 12c, which are symmetrically positioned relative to the axis of the rotor core 1c, with their magnetic poles set in the same direction, such that the two hard magnetic bodies 12c can constitute a magnetic circuit together with the rotor core 1c and the stator core 2c.

In the above four embodiments, the second air gap is designed to be linear along a certain diameter direction of the rotor core. For example, the second air gaps in Embodiments 1 and 2 are in parallel with a certain diameter of the rotor core; and the second air gaps in Embodiments 3 and 4 are located where a certain diameter of the rotor core is. It is discovered by research that the size of the hard magnet has a certain influence on the linearity of the angular position sensor, the slender the hard magnet is, the better the linearity of the angular position sensor will be. However, when the second air gap is filled with the hard magnet, the size of the hard magnet can be set according to the size of the second air gap. The size of the second air gap in the above-mentioned diameter direction is called its length, and the size of the second air gap in the radial direction of the rotor core its width. Here take Embodiment 1 as an example for convenience, and please see FIG. 2 for details. The second air gap 10 is in parallel with the diameter D of the rotor core and located at a side of the diameter D, with its size in this diameter direction X being called its length L and its size in the radial direction Y of the rotor core its width S. It is discovered by research that when the ratio of the length L to the width S of the second air gap 10 is bigger than or equal to 5:1, which in this section means the ratio of length to width of the hard magnet 12 is bigger than or equal to 5:1, the requirement of the linearity of the angular position sensor can then be met. In addition, the bigger the ratio of length to width of the hard magnetic material is, the better the linearity of the angular position sensor will be. However, due to restriction of the practical production process, the ratio as required is acceptable, such as 12:1.

It is discovered by the further research that the ratio of the width H of the first air gap 3 to the width S of the second air gap 10 also has a certain influence on the linearity of the angular position sensor, that is, the bigger the width ratio is, the better the linearity of the angular position sensor will be. In practice, however, the width H of the first air gap 3 is already small enough, usually a few millimeters (4 mm). Therefore, in consideration of the processing difficulty, the ratio could not be infinitely big. It is discovered by research that the requirement can be met when the ratio is equal to 2:1. Therefore, the ratio of the width H of the first air gap 3 to the width S of the second air gap 10 is bigger than or equal to 2:1.

Embodiment 5

Figure 7:
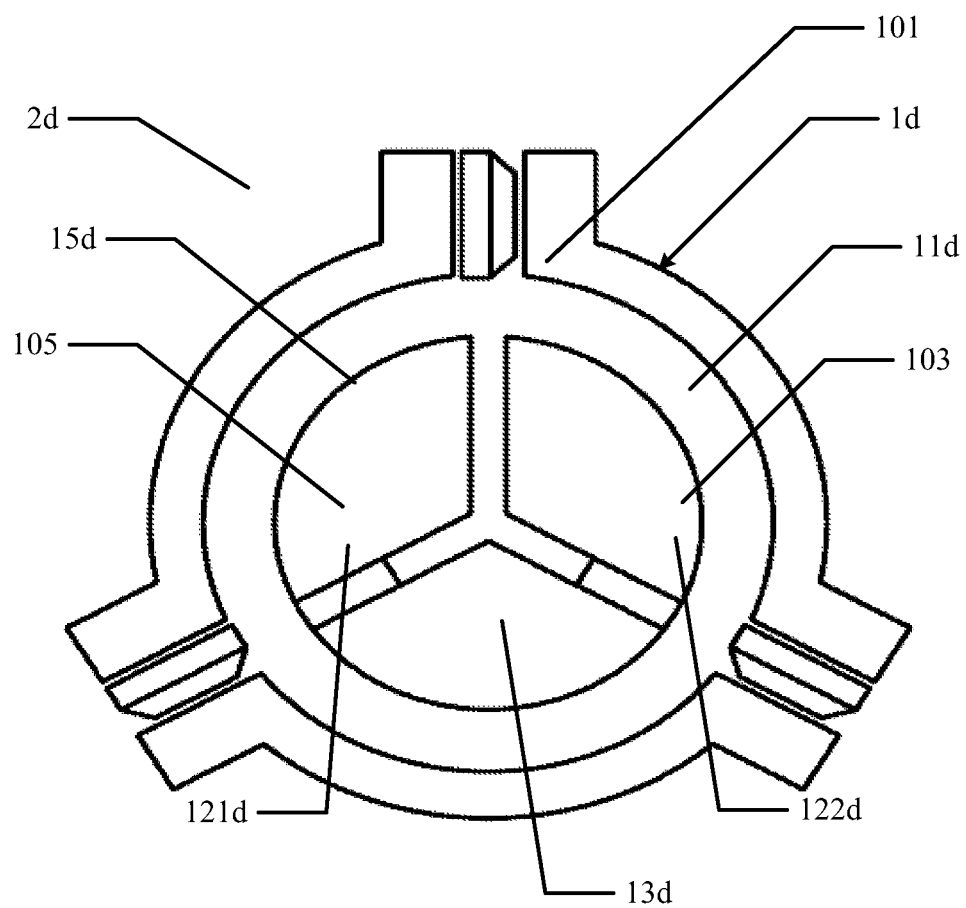
FIG. 7 is a structural schematic drawing of the angular position sensor provided in Embodiment 5 of the present invention.

Reference is made to FIG. 7 which is a structural schematic drawing of the angular position sensor provided in Embodiment 5 of the present invention. The structure of the stator core 2 in this embodiment is the same with that in Embodiment 1, and will no longer be described here in detail. They are different in the structure of the rotor core 1d. The rotor core 1d is composed of three rotor portions 11d, 13d and 15d, between which forms a second air gap. Therefore, this second air gap includes three portions 101, 103 and 105 uniformly distributed in three radial directions of the rotor core 1d, wherein the two portions 103 and 105 therein are provided inside with a first hard magnet 121d and a second hard magnet 122d, respectively, to constitute a magnetic circuit together with the rotor core 1d and the stator core 2d. In addition, the magnetic poles of the first hard magnet 121d and the second hard magnet 122d are set in the opposite direction, so as to prevent the line of magnetic force from being closed inside the rotor core 1d.

Embodiment 6

Figure 8:
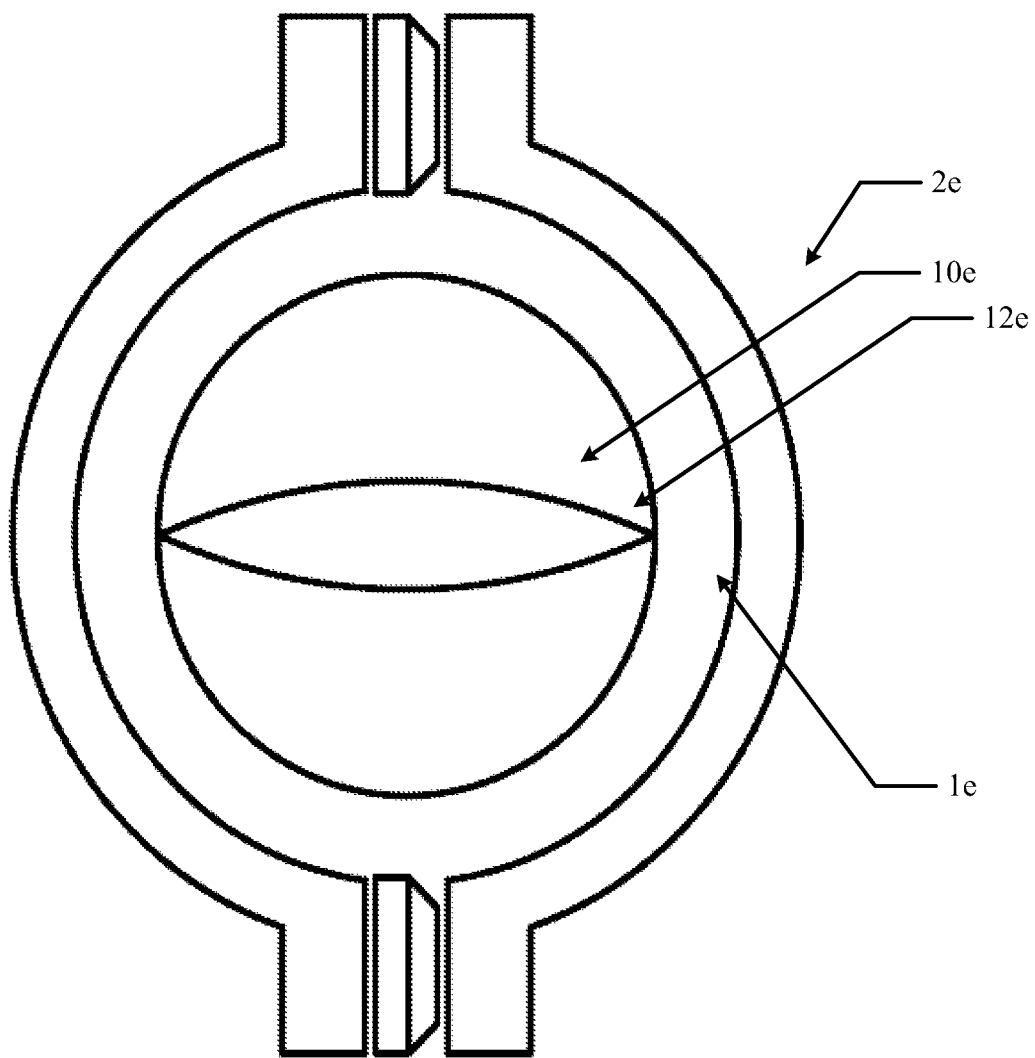
FIG. 8 is a structural schematic drawing of the angular position sensor provided in Embodiment 6 of the present invention.

Reference is made to FIG. 8 which is a structural schematic drawing of the angular position sensor provided in Embodiment 6 of the present invention. In this embodiment, the second air gap 10e is different from those in the above embodiments mainly in shape that it is a shuttle-shaped air gap located at a certain diameter of the rotor core 1e. It is filled with a hard magnet 12e, so as to constitute a magnetic circuit together with the rotor core 1e and the stator core 2e. It is further explained in this embodiment that the reasonable setting of the ratio of the width H of the first air gap to the diameter D of the rotor core allows for more flexible design of the rotor core. That is, with the shape of the second air gap slightly changed, the line of magnetic force where the magnetic flux sensing element is located can still be distributed relatively uniformly, making the angular position sensor obtain good linearity within a wider range.

It can be seen from the embodiments of the present invention that, by substituting a certain combination of the hard magnetic material and the soft magnetic material for the prior art ring magnet, one can obtain the exterior magnetic field effect that is close to what the ring magnet produces and can further be improved by the change of the size of the air gap and the hard magnetic material, such that the magnetic flux density where the magnetic flux sensing element is located is directly proportional to the rotation angle of the rotor core relative to the stator core within a wider range for better linearity.

Figure 9:
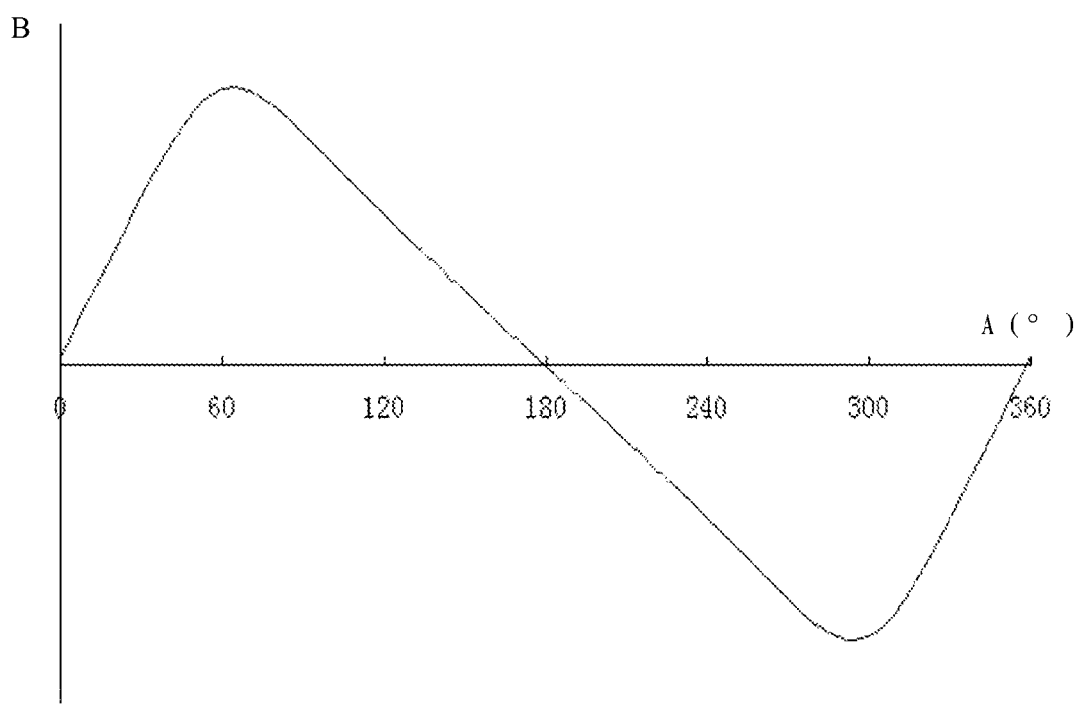
FIG. 9 is a schematic drawing of the relation between the magnetic induction intensity and the rotation angle obtained according to one embodiment of the present invention.

FIG. 9 is a schematic drawing of the relation between the magnetic induction intensity and the rotation angle obtained according to one embodiment of the present invention. As shown in the drawing, the magnetic induction intensity B obtains the better linearity when the rotation angle A is between 60° and 300°, and it comes to the complete linearity range bigger than 180°.

What mentioned above is only for illustration, and will not limit the present invention. The extent of protection of the present invention should be determined by the terms of the claims.

The angular position sensor according to the present invention includes a rotor core as well as a stator core coaxially around this rotor core, wherein a first air gap is provided between the rotor core and the stator core, a second air gap with a hard magnet therein is provided inside the rotor core, and a third air gap with a magnetic flux sensing element therein is provided inside the stator core. It is obvious that the present invention, by substituting the combination of the hard magnet and the rotor core for the design of ring magnet in the prior art, obtains the good linearity within a wider range.

Compared with the prior art, the present invention is easy in assembly, as well as lower in cost and simplified in process due to no need for processing the more difficult ring magnet. Thus, it possesses practical applicability in Industry.

The invention claimed is:

1. An angular position sensor, comprising:
a rotor core as well as a stator core coaxially around this rotor core, wherein
a first air gap is provided between the rotor core and the stator core, which is a uniformly distributed ring air gap, with its size in the radial direction of the rotor core being called width of the first air gap, and the ratio of its width to the diameter of the rotor core being bigger than or equal to 1:5;
a second air gap with a hard magnet therein is provided inside the rotor core; and
a third air gap with a magnetic flux sensing element therein is provided inside the stator core;
wherein the second air gap is designed to be linear along a certain diameter direction of the rotor core, with the size of the second air gap in this diameter direction being called its length and the size of the second air gap in the radial direction of the rotor core its width; and
wherein the ratio of the length to the width of the second air gap is bigger than or equal to 5:1 but less than 55:2.

2. The angular position sensor according to claim 1, wherein the second air gap is filled with the hard magnet.

3. The angular position sensor according to claim 1, wherein the ratio of the width of the first air gap to that of the second air gap is bigger than or equal to 2:1.

4. The angular position sensor according to claim 1, wherein the second air gap is in parallel with the above-mentioned diameter and located at one side of the diameter.

5. The angular position sensor according to claim 1, wherein the second air gap includes a first portion and a second portion, which are in parallel with the above-mentioned diameter and located at both sides of this diameter.

6. The angular position sensor according to claim 5, wherein the above-mentioned first portion and second portion are provided inside with a hard magnet, respectively, whose magnetic poles are set in the same direction.

7. The angular position sensor according to claim 1, wherein the second air gap is located where the above-mentioned diameter is.

8. The angular position sensor according to claim 7, wherein the second air gap is provided inside with two hard magnets symmetrical to the axis of the rotor core, magnetic poles of the two hard magnets being set in the same direction.

9. The angular position sensor according to claim 7, wherein the second air gap is provided in the middle with one hard magnet.

10. The angular position sensor according to claim 1, wherein the second air gap includes three portions uniformly distributed in three radial directions of the rotor core, with the two portions therein being provided with a first hard magnet and a second hard magnet, respectively.

11. The angular position sensor according to claim 10, wherein the magnetic poles of the first and the second hard magnets are set in the opposite direction.

12. The angular position sensor according to claim 1, wherein the second air gap, located at a certain diameter of the rotor core, is of a shuttle-shaped design.

13. The angular position sensor according to claim 1, wherein the rotor core includes multiple rotor portions, with the above-mentioned second air gap formed between two adjacent rotor portions.

14. The angular position sensor according to claim 1, wherein the stator core includes multiple stator portions, with the above-mentioned third air gap formed between two adjacent stator portions.

15. The angular position sensor according to claim 1, wherein the rotor core and the stator core are made from soft magnetic material.

* * * * *